United States Patent
Ballachino

(10) Patent No.: US 7,571,204 B1
(45) Date of Patent: Aug. 4, 2009

(54) M-BIT RACE DELAY ADDER AND METHOD OF OPERATION

(75) Inventor: William E. Ballachino, Irving, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 225 days.

(21) Appl. No.: 09/667,164

(22) Filed: Sep. 21, 2000

(51) Int. Cl.
*G06F 7/50* (2006.01)

(52) U.S. Cl. .................................................. 708/714

(58) Field of Classification Search .......... 708/700–714
See application file for complete search history.

(56) References Cited

U.S. PATENT DOCUMENTS

| | | | | |
|---|---|---|---|---|
| 3,553,446 A | * | 1/1971 | Kruy | 708/714 |
| 4,623,982 A | * | 11/1986 | Ware | 708/714 |
| 4,682,303 A | * | 7/1987 | Uya | 708/714 |
| 5,018,093 A | * | 5/1991 | Shih | 708/533 |
| 5,126,965 A | * | 6/1992 | Asato et al. | 708/714 |
| 5,163,020 A | | 11/1992 | Chau | |
| 5,181,186 A | * | 1/1993 | Al-Ofi | 708/710 |
| 5,204,832 A | * | 4/1993 | Nakakura | 708/714 |
| 5,272,662 A | | 12/1993 | Scriber et al. | |
| 5,396,445 A | * | 3/1995 | Lal | 708/714 |
| 5,499,203 A | * | 3/1996 | Grundland | 708/710 |
| 5,523,963 A | * | 6/1996 | Hsieh et al. | 708/707 |
| 5,579,254 A | * | 11/1996 | Kumar et al. | 708/714 |
| 5,732,008 A | * | 3/1998 | Abu-Khater et al. | 708/714 |
| 5,787,492 A | * | 7/1998 | Shuma et al. | 708/708 |
| 5,852,568 A | * | 12/1998 | Ranjan | 708/714 |
| 5,875,125 A | * | 2/1999 | Hwang et al. | 708/710 |

FOREIGN PATENT DOCUMENTS

| | | |
|---|---|---|
| EP | 0 352 549 A2 | 1/1990 |
| WO | WO 98/51013 A1 | 11/1998 |

OTHER PUBLICATIONS

Akhilesh, A reduced-area scheme for carry-selected adders, 1993, IEEE transactions on computers, vol. 42, No. 10, pp. 1163-1170.*

(Continued)

*Primary Examiner*—Chat C Do
(74) *Attorney, Agent, or Firm*—Lisa K. Jorgenson; William A. Munck

(57) ABSTRACT

There is disclosed an M-bit adder capable of receiving a first M-bit argument, a second M-bit argument, and a carry-in (CI) bit. The M-bit adder comprises M adder cells arranged in R rows, wherein a least significant adder cell in a first one of the rows of adder cells receives a first data bit, $A_X$, from the first M-bit argument and a first data bit, $B_X$, from the second M-bit argument, and generates a first conditional carry-out bit, $C_X(1)$, and a second conditional carry-out bit, $C_X(0)$, wherein the $C_X(1)$ bit is calculated assuming a row carry-out bit from a second row of adder cells preceding the first row is a 1 and the $C_X(0)$ bit is calculated assuming the row carry-out bit from the second row is a 0.

26 Claims, 8 Drawing Sheets

OTHER PUBLICATIONS

Abu-Khater et al., Circuit/Architecture for low-power high-performance 32 bit adder, 1995, IEEE, pp. 74-77.*

Becker et al., A performance driven generator for efficient testable conditional sum adders, 1992, IEEE, pp. 370-375.*

Cheng et al., The improvement of conditional sum adder for low power applications, 1998, IEEE, pp. 131-134.*

Department of Electrical Engineering of Linkopings University, "Arithmetic Building Blocks", Prentice Hall, 1995, pp. 1-21, retrieved from the internet: www.ek.isy.liu.se/course/tsek30/current/Arithm.pdf, on Jun. 1, 2006.

David A. Patterson et al., "Computer Architecture A Quantitative Approach", 1990 Morgan Kaufmann Publishers, Inc., San Francisco, California, pp. A45-A46.

* cited by examiner

M-BIT RACE DELAY ADDER AND METHOD OF OPERATION

TECHNICAL FIELD OF THE INVENTION

The present invention is directed, in general, to data processors and, more specifically, to an M-bit race delay adder, also known as a pyramid adder, for use in a data processor.

BACKGROUND OF THE INVENTION

The demand for high performance computers and communication devices requires that state-of-the-art digital signal processors (DSPs) and general purpose microprocessors, such as x86 based microprocessors, execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

Superpipelining refers to the simultaneous processing of multiple instructions in the pipeline. For example, if a processor executes each instruction in five stages and each stage requires a single clock cycle to perform its function, then five separate instructions can be processed simultaneously in the pipeline, with the processing of one instruction completed during each clock cycle. Hence, the instruction throughput of an N stage pipelined architecture is, in theory, N times greater than the throughput of a non-pipelined architecture that completes only one instruction every N clock cycles. However, the speed improvements provided by pipeline architectures and superpipelining processing are ultimately limited by speed at which the individual stages in the pipeline execute. It is therefore important to minimize the time required to execute each part of an instruction.

Mathematical operations often incur substantial time delays in calculating a value, particularly additions of two arguments containing a large number of bits. For example, adding two 32-bit numbers or two 64-bit numbers often results in a substantial time penalty. The delay is usually related to the propagation delay of a carry bit throughout the length of the sum. For example, a typical 32-bit adder may have as its inputs a first 32-bit argument, a second 32-bit argument, and a carry-in bit from a previous stage. The 32-bit adder may comprise 32 carry-sum cells, where each cell receives one bit from each argument and a carry bit from a lower order cell and generates a sum bit and a carry bit. For example, the fifth carry-sum cell receives the fifth bit from a first 32-bit argument, the fifth bit from a second 32-bit argument, and the carry bit from the fourth cell. Unfortunately, the output of the 32-bit adder is not correct until the carry bit ripples through all 32 cells. This results in a significant time delay.

Therefore, there is a need in the art for improved data processors maximize instruction throughput. In particular, there is a need in the art for improved adder circuits capable of rapidly adding two arguments containing a large number of bytes. More particularly, there is a need for improved adder circuits that minimize the carry ripple delay caused by adding two large arguments.

SUMMARY OF THE INVENTION

To address the above-discussed deficiencies of the prior art, it is a primary object of the present invention to provide an M-bit adder capable of receiving a first M-bit argument, a second M-bit argument, and a carry-in (CI) bit. According to an advantageous embodiment of the present invention, the M-bit adder comprises M adder cells arranged in R rows, wherein a least significant adder cell in a first one of the rows of adder cells receives a first data bit, $A_X$, from the first M-bit argument and a first data bit, $B_X$, from the second M-bit argument, and generates a first conditional carry-out bit, $C_X(1)$ and a second conditional carry-out bit, $C_X(0)$, wherein the $C_X(1)$ bit is calculated assuming a row carry-out bit from a second row of adder cells preceding the first row is a 1 and the $C_X(0)$ bit is calculated assuming the row carry-out bit from the second row is a 0.

According to one embodiment of the present invention, the least significant adder cell generates a first conditional sum bit, $S_X(1)$, and a second conditional sum bit, $S_X(0)$.

According to another embodiment of the present invention, the $S_X(1)$ bit is calculated assuming the row carry-out bit from the second row is a 1 and the $S_X(0)$ bit is calculated assuming the row carry-out bit from the second row is a 0.

According to still another embodiment of the present invention, the row carry-out bit selects one of the $S_X(1)$ bit and the $S_X(0)$ bit to be output by the least significant adder cell.

According to yet another embodiment of the present invention, the first row of adder cells further comprises a second adder cell coupled to the least significant adder cell, wherein the second adder cell receives a second data bit, $A_{X+1}$, from the first M-bit argument and a second data bit, $B_{X+1}$, from the second M-bit argument, and receives from the least significant adder cell the $C_X(1)$ bit and the $C_X(0)$ bit.

According to a further embodiment of the present invention, the second adder cell generates a first conditional carry-out bit, $C_{X+1}(1)$, wherein the $C_{X+1}(1)$ bit is generated from the $A_{X+1}$ data bit, the $B_{X+1}$ data bit, and the $C_X(1)$ bit from the least significant adder cell.

According to a yet further embodiment of the present invention, the second adder cell generates a second conditional carry-out bit, $C_{X+1}(0)$, wherein the $C_{X+1}(0)$ bit is generated from the $A_{X+1}$ data bit, the $B_{X+1}$ data bit, and the $C_X(0)$ bit from the least significant adder cell.

According to a still further embodiment of the present invention, the second adder cell generates a first conditional sum bit, $S_{X+1}(1)$, wherein the $S_{X+1}(1)$ bit is generated from the $A_{X+1}$ data bit, the $B_{X+1}$ data bit, and the $C_X(1)$ bit from the least significant adder cell.

In one embodiment of the present invention, the second adder cell generates a second conditional sum bit, $S_{X+1}(0)$, wherein the $S_{X+1}(0)$ bit is generated from the $A_{X+1}$ data bit, the $B_{X+1}$ data bit, and the $C_X(0)$ bit from the least significant adder cell.

In another embodiment of the present invention, the row carry-out bit selects one of the $S_{X+1}(1)$ bit and the $S_{X+1}(0)$ bit to be output by the second adder cell.

In still another embodiment of the present invention, the first row of adder cells contains N adder cells and the second row of adder cells preceding the first row contains less than N adder cells.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged adder.

Figure 1:
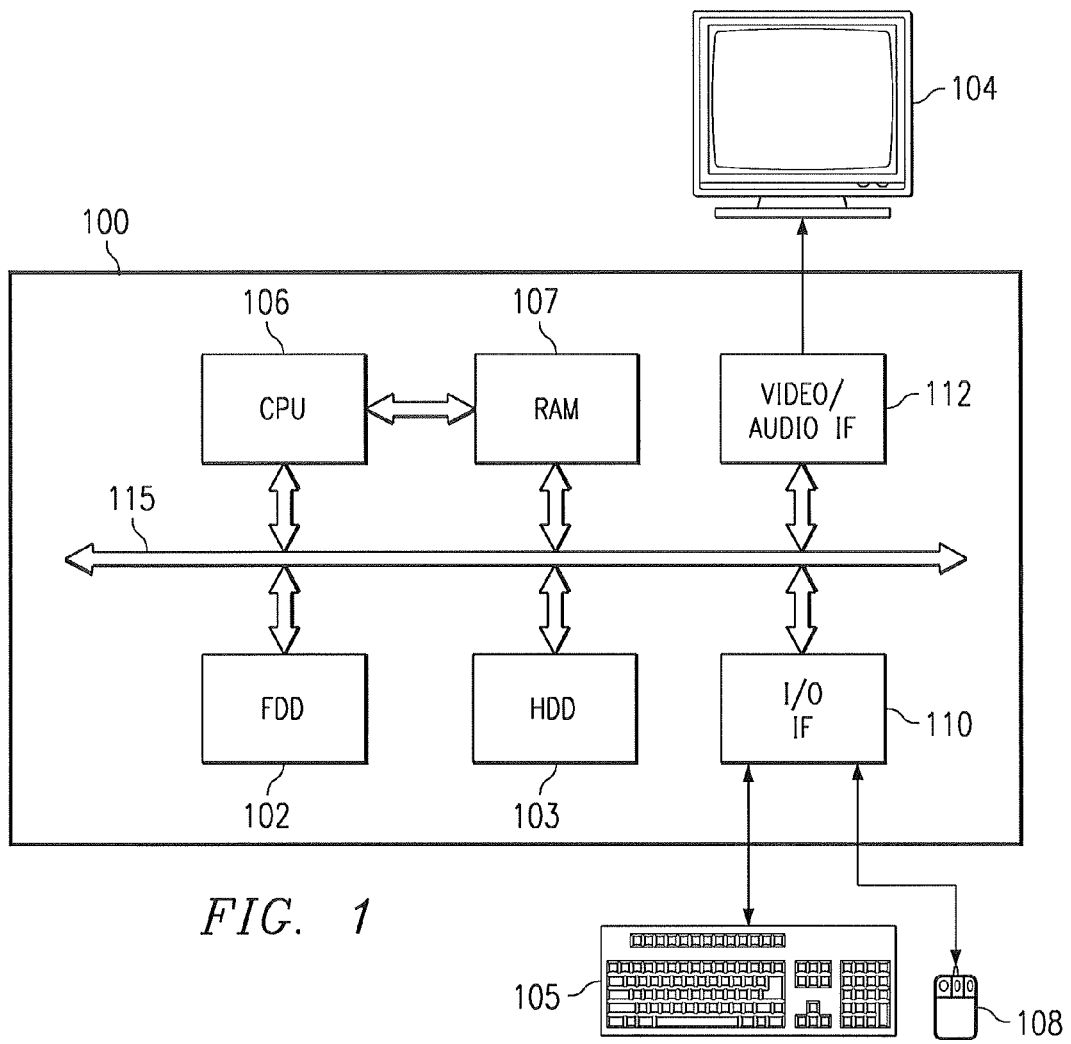
FIG. 1 illustrates an exemplary processing system, namely a personal computer, that implements an improved cache memory in accordance with the principles of the present invention.

FIG. 1 illustrates an exemplary processing system, namely personal computer (PC) 100, that contains an M-bit race delay adder in accordance with the principles of the present invention. Personal computer 100 comprises removable (i.e., floppy) disk drive (FDD) 102 and hard disk drive (HDD) 103, monitor 104, keyboard 105, processor (CPU) 106, main memory 107, and a pointing device, such as mouse 108. Monitor 104, keyboard 105, and mouse 108 may be replaced by, or combined with, other input/output (I/O) devices. Removable disk drive 102 is capable of reading and writing to removable floppy diskettes. Hard disk drive 105 provides fast access for storage and retrieval of application programs and data.

Keyboard 105 and mouse 108 are coupled to PC 100 via input/output (I/O) interface (IF) 110. Monitor 104 is coupled to PC 100 via video/audio interface (IF) 112. The internal components of PC 100, including floppy disk drive 102, hard disk drive 103, processor 106, main memory 107, I/O interface 110 and video/audio interface 112, are coupled to and communicate across communications bus 115.

In an exemplary embodiment of the present invention, main memory 107 comprises a volatile storage device, such as a dynamic random access memory (RAM) Processor 106 may comprise an on-board two level cache system, including a Level 1 (L1) cache and a Level 2 (L2) cache. The two level cache is a system in which a small, fast cache (the L1 cache) is connected to a slower, larger cache (the L2 cache). When the central processing unit (CPU) core logic of processor 106 reads or writes data to or from a memory location in main memory 107, the cache system first tests to see if the data belonging to that location is in the L1 cache. If the data is in the L1 cache, then the data is provided or updated quickly by the L1 cache. If the data is not in the L1 cache, then an L1 cache read "miss" or an L1 cache write "miss" has occurred.

The data is then provided or updated to the CPU core logic of processor 106 by the L2 cache. In the case of an L1 cache read miss, the line containing the requested data is also transferred from the L2 cache to the L1 cache, so that the data may be provided more quickly the next time processor 106 accesses the data. This is known as an L1 cache line fill. If the data is also not in the L2 cache, then an L2 cache miss has occurred and the line containing the requested data is fetched from main memory 107 and then loaded into the L2 cache for faster access the next time the data is requested. This is known as an L2 cache line fill.

Figure 2:
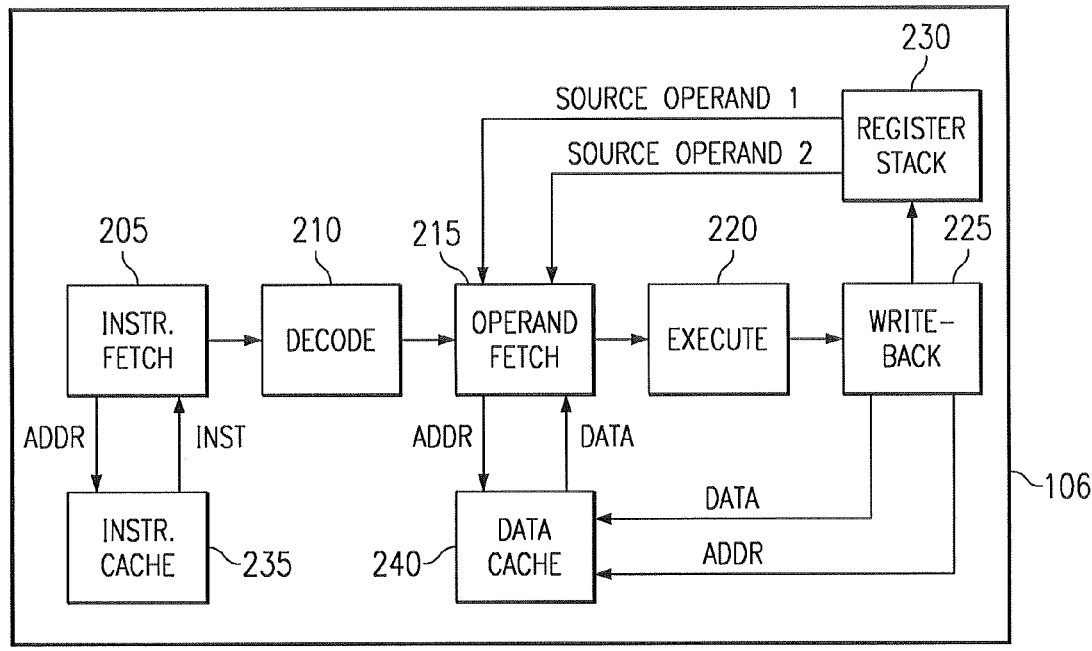
FIG. 2 illustrates in greater detail an exemplary processor according to one embodiment of the present invention.

FIG. 2 illustrates in greater detail exemplary processor 106 according to one embodiment of the present invention. Processor 106 contains an instruction pipeline comprising instruction fetch (IF) stage 205, decode stage 210, operand fetch stage 215, execute stage 220, and write-back stage 225. Processor 106 also comprises register stack 230, instruction (INSTR.) cache 235 and data cache 240.

Processor 106 is a central processing unit (CPU) capable of fetching and interpreting instructions, retrieving data, executing instructions, and storing results. The illustrated instruction pipeline is a mechanism capable of executing several different operations concurrently. The pipeline does this by breaking down the processing steps for each major task into several discrete processing phases, each of which is executed by a separate pipeline stage. Each task must pass sequentially through each processing phase, and hence each pipeline stage, to complete its execution.

Instruction fetch stage 205 fetches instructions to be executed from instruction cache 235 and stores the fetched instructions in an instruction fetch buffer (IFB). The instructions taken from the IFB by decode stage 210 are encoded in a highly compact form. Decode stage 210 decodes the instructions into larger sets of signals that can be used directly for execution by subsequent pipeline stages. Operand fetch stage 215 fetches operands from memory or from register stack 230. Execute stage 220 performs the actual operation (e.g., add, multiply, divide, and the like) on the operands fetched by operand fetch stage 215 and generates the result. Write-back stage 225 writes the result generated by execute stage 220 into data cache 240 or into one of the registers in register stack 230.

Execute stage 220 may contain one or more M-bit race delay adders (or pyramid adders) according to the principles of the present invention. An M-bit race delay adder comprises R rows of adder cells, where each row generally contains one more adder cell than the preceding (lower order) row. Thus the number of cells in each row from largest row to smallest row has the general form: N, N−1, N−2, N−3, . . . , N−p+1, N−p, and K. The largest row contains N adder cells, the second largest row contains N−1 adder cells, and so forth. The smallest row contains K cells, which may be smaller than the second smallest row (i.e., N−p) by more than one cell. This is because there is no guarantee that the total number of adder cells, M, of an M-bit race delay adder will be exactly equal to the sum of consecutive counting numbers (i.e., M may not equal 1+2+3+ . . . +(N−1)+N).

By way of example, if M=32, a 32-bit race delay adder comprises 32 adder cells arranged in six rows (i.e., Row 0, Row 1, Row 2, Row 3, Row 4, and Row 5) containing 2, 4, 5, 6, 7, and 8 adder cells, respectively. In this case, N=8, (N−p)=4, and K=2. In another exemplary embodiment, if M=64, a 64-bit race delay adder comprises 64 adder cells arranged in ten rows (i.e., Row 0 through Row 9) containing 1, 3, 4, 5, 6, 7, 8, 9, 10 and 11 adder cells, respectively. In this case, N=11, (N−p)=3, and K=1.

It should be noted that in an alternate embodiment, a 64-bit race delay adder may comprise 64 adder cells arranged in eight rows (i.e., Row 0 through Row 7) containing 1, 6, 7, 8, 9, 10, 11 and 12 adder cells, respectively. In this case, N=12, (N−p)=6, and K=1. However, as will be explained below in greater detail, the carry ripple delay (and therefore the speed) of an M-bit race delay adder is determined by the length of the longest row. The 64-bit race delay adder having a longest row of N=12 has a longer delay than a 64-bit race delay having a longest row of N=11. Therefore, it is important to minimize the length of the longest row in an M-bit race delay adder.

Figure 3:
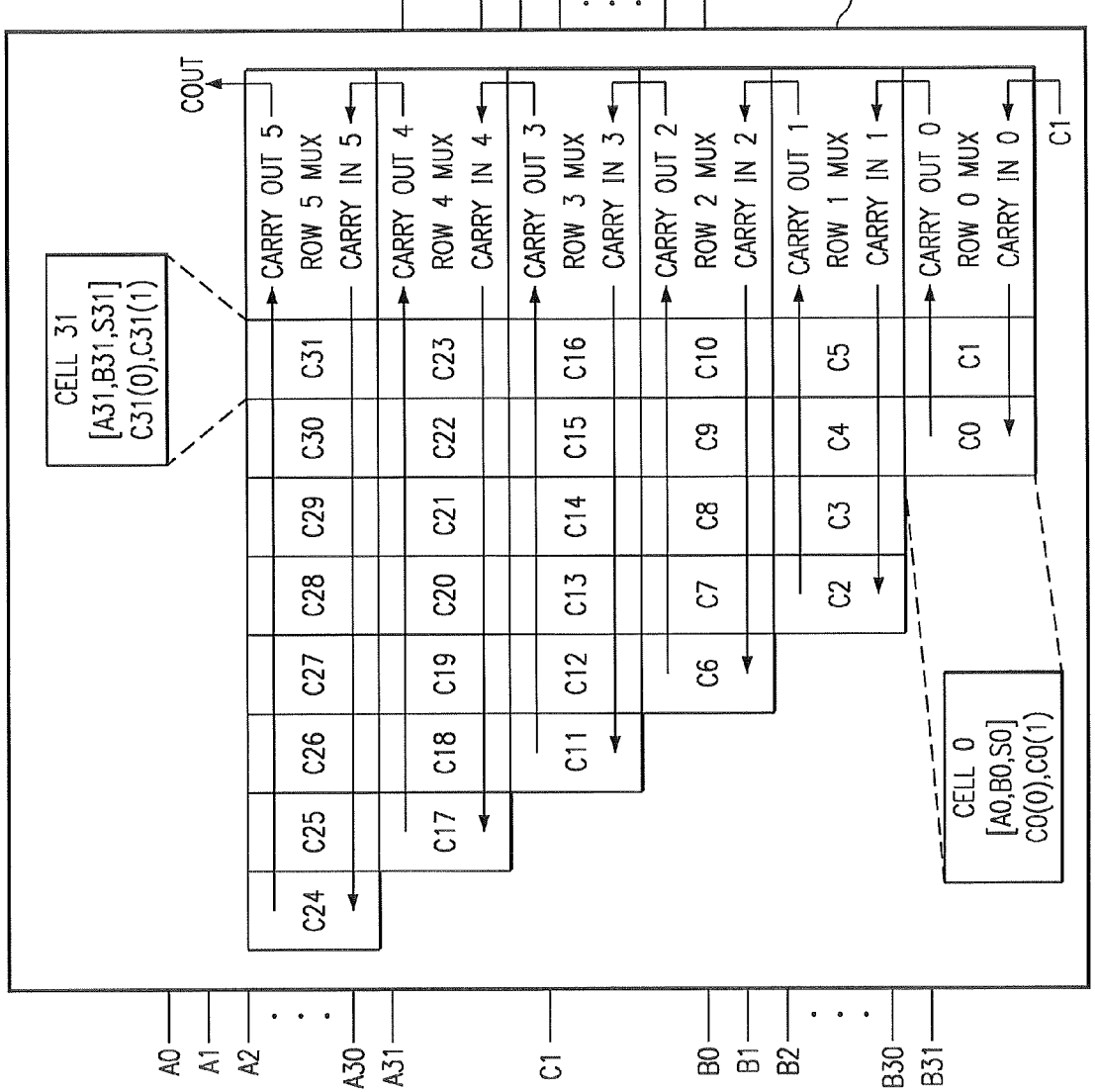
FIG. 3 is a logical block diagram illustrating the architecture of an exemplary 32-bit race delay adder in the processor according to one embodiment of the present invention.

FIG. 3 is a logical block diagram illustrating the architecture of exemplary 32-bit race delay adder 300 in processor 106 according to one embodiment of the present invention. 32-bit race delay adder 300 has 65 inputs and 33 outputs. The 65 inputs include a first 32-bit argument (A0 through A31), a second 32-bit argument (B0 through B31), and a carry-in (CI) bit from a previous stage, if any. The 33 outputs include a 32-bit sum (S0 through S31) and a carry-out (COUT) bit to the next stage, if any. The physical connections between the input pins and the 32 adder cells and between the output pins and the 32 adder cells are not shown in order to more clearly explain the operation of 32-bit race delay adder 300.

The two 32-bit inputs are added by 32 adder cells, labeled C0 through C31. Expanded views of the least significant adder cell, Cell 0 (or C0), and the most significant adder cell, Cell 31 (or C31), are also shown. Row 0 comprises Cell 0 and Cell 1. Row 1 comprises Cell 2, Cell 3, Cell 4, and Cell 5. Row 2 comprises Cell 6 through Cell 10. Row 3 comprises Cell 11 through Cell 16. Row 4 comprises Cell 17 through Cell 23. Finally, Row 5 comprises Cell 24 through Cell 31.

Each row generates a Carry Out bit that is the Carry In bit to the next higher row. Row 0 receives the CI bit of 32-bit race delay adder 300 from the previous adder stage. The Carry Out 0 bit from Row 0 is the Carry In 1 bit for Row 1. The Carry Out 1 bit from Row 1 is the Carry In 2 bit for Row 2. The Carry Out 2 bit from Row 2 is the Carry In 3 bit for Row 3. The Carry Out 3 bit from Row 3 is the Carry In 4 bit for Row 4. The Carry Out 4 bit from Row 4 is the Carry In 5 bit for Row 5. The Carry Out 5 bit from Row 5 generates the COUT bit from 32-bit race delay adder 300 that is sent to the next adder stage.

In accordance with the principles of the present invention, each of the 32 adder cells in 32-bit race delay adder 300 is actually a dual adder that calculates two sum bits and two carry bits. One sum bit and one carry bit are calculated based on the assumption that the carry bit from the previous row was a Logic 0. The other sum bit and the other carry bit are calculated based on the assumption that the carry bit from the previous stage was a Logic 1. The cell at the start of each row (C0, C2, C6, C11, C17 and C24) begins the process by generating two sum bits and two carry bits and passing the two carry bits to the next higher cell in the row. The dual carry bits ripple through the adder cells in each row and are output to a row multiplexer at the end of each row. The carry bit from the previous row controls a multiplexer within each adder cell that selects the correct sum bit to be output to S0 through S31. The carry bit from the previous row also controls the row multiplexer at the end of each row in order to select the correct carry bit to be output the next higher row.

Cell 0, which is shown in expanded detail, receives two inputs, A0 and B0. Cell 0 generates two sum bits, S0(0) and S0(1), and two carry bits, C0(0) and C0(1). The S0(0) bit is the sum of A0 and B0 assuming Carry In 0 (i.e., CI) was 0. The S0(1) bit is the sum of A0 and B0 assuming Carry In 0 (i.e., CI) was 1. Similarly, the C0(0) bit is the carry-out of A0+B0 assuming Carry In 0 was 0 and the C0(1) bit is the carry-out of A0+B0 assuming Carry In 0 was 1. An internal multiplexer selects only one of S0(0) and S0(1) to be output to the S0 output pin of 32-bit race delay adder 300. However, both C0(0) and C0(1) are output to the next adder cell in Row 0, namely Cell 1 (C1).

Cell 1 receives the external inputs A1 and B1 and the two carry bits from Cell 0, namely C0(0) and C0(1). Cell 0 generates two sum bits, S1(0) and S1(1), and two carry bits, C1(0) and C1(1). The S1(0) bit is the sum of A1, B1 and C0(0) (i.e., assumes Carry In 0 was 0). The S1(1) bit is the sum of A1, B1 and C0(1) (i.e., assumes Carry In 0 was 1). The C1(0) bit is the carry-out of A1+B1+C0(0) and the C1(1) bit is the carry-out of A1+B1+C0(1). An internal multiplexer selects only one of S1(0) and S1(1) to be output to the S1 output pin of 32-bit race delay adder 300. However, both C1(0) and C1(1) are output to Row 0 multiplexer (MUX).

CI (i.e., Carry In 0) controls Row 0 MUX. Depending on whether CI=0 or CI=1, Row 0 MUX selects either C1(0) or C1(1) to be the carry-out from Row 0 (i.e., Carry Out 0). In FIG. 3, the left pointing arrow in Row 0 indicates the Carry In 0 bit is applied to all adder cells (Cell 0 and Cell 1) in Row 0 in order to select the correct sum bits (S0 and S1) to be sent to the output pins. The right pointing arrow in Row 0 indicates the direction that the dual carry bits ripple through Cell 0 and Cell 1 in Row 0 in order to generate the C1(0) and C1(1) carry bits that are applied to Row 0 MUX.

Row 1 performs as dual addition process similar to the dual addition process that occurs in Row 0. Cell 2 is similar to Cell 0. Cell 2 receives two inputs, A2 and B2. Cell 2 generates two sum bits, S2(0) and S(1), and two carry bits, C2(0) and C2(1). The S2(0) bit is the sum of A2 and B2 assuming Carry In 1 (i.e., Carry Out 0) was 0. The S2(1) bit is the sum of A2 and B2 assuming Carry In 1 (i.e., Carry Out 0) was 1. Similarly, the C2(0) bit is the carry-out of A2+B2 assuming Carry In 1 was 0 and the C2(1) bit is the carry-out of A2+B2 assuming Carry In 1 was 1. An internal multiplexer selects only one of S2(0) and S2(1) to be output to the S2 output pin of 32-bit race delay adder 300. However, both C2(0) and C2(1) are output to the next adder cell in Row 1, namely Cell 3 (C3).

Cell 3 receives the external inputs A3 and B3 and the two carry bits from Cell 2, namely C2(0) and C2(1). Cell 3 generates two sum bits, S3(0) and S3(1), and two carry bits, C3(0) and C3(1) The S3(0) bit is the sum of A3, B3 and C2(0) (i.e., assumes Carry In 1 was 0). The S3(1) bit is the sum of A3, B3 and C2(1) (i.e., assumes Carry In 1 was 1). The C3(0) bit is the carry-out of A3+B3+C2(0) and the C3(1) bit is the carry-out of A3+B3+C2(1). An internal multiplexer selects only one of S3(0) and S3(1) to be output to the S3 output pin of 32-bit race delay adder 300. However, both C3(0) and C3(1) are output to the next adder cell in Row 1, namely Cell 4 (C4).

Cell 4 is similar to Cell 3. Cell 4 receives the external inputs A4 and B4 and the two carry bits from Cell 3, namely C3(0) and C3(1). Cell 4 generates two sum bits, S4(0) and S4(1), and two carry bits, C4(0) and C4(1). The S4(0) bit is the sum of A4, B4 and C3(0). The S4(1) bit is the sum of A4, B4 and C3(1). The C4(0) bit is the carry-out of A4+B4+C3(0) and the C4(1) bit is the carry-out of A4+B4+C3(1). An internal multiplexer selects only one of S4(0) and S4(1) to be output to the S4 output pin of 32-bit race delay adder 300. However, both C4(0) and C4(1) are output to the next adder cell in Row 1, namely Cell 5 (C5).

Cell 5 is similar to Cell 3 and Cell 4. Cell 5 receives the external inputs A5 and B5 and the two carry bits from Cell 4, namely C4(0) and C4(1). Cell 5 generates two sum bits, S5(0) and S5(1), and two carry bits, C5(0) and C5(1). The S5(0) bit is the sum of A5, 35 and C4(0). The S5(1) bit is the sum of A5, B5 and C4(1). The C5(0) bit is the carry-out of A5+B5+C4(0) and the C5(1) bit is the carry-out of A5+B5+C4(1). An internal multiplexer selects only one of S5(0) and S5(1) to be output to the S5 output pin of 32-bit race delay adder 300. However, both C5(0) and C5(1) are output to Row 1 multiplexer (MUX).

Carry In 1 controls Row 1 MUX. Depending on whether Carry In 1=0 or Carry In 1=1, Row 1 MUX selects either C5(0) or C5(1) to be the carry-out from Row 1 (i.e., Carry Out 1). In FIG. 3, the left pointing arrow in Row 1 indicates the Carry In 1 bit is applied to all adder cells (Cell 2 through Cell 5) in Row 1 in order to select the correct sum bits (S2, S3, S4 and S5) to be sent to the output pins. The right pointing arrow in Row 1 indicates the direction that the dual carry bits ripple through Cell 2, Cell 3, Cell 4 and Cell 5 in Row 1 in order to generate the C5(0) and C5(1) carry bits that are applied to Row 1 MUX.

Row 2, Row 3, Row 4 and Row 5 operate in the similar manner as Row 0 and Row 1. For the purpose of simplicity and to avoid redundancy in explaining the operation of the present invention, the operations of Row 2, Row 3, Row 4 and Row 5 will not be described in detail at this point.

In all rows, the first adder cell (i.e., C0, C2, C6, C11, C17 and C24) receives two inputs, Ax and Bx, and generates a first sum bit, Sx(0), and a first carry bit, Cx(0), assuming the carry-in bit from the previous row was 0, and a second sum bit, Sx(1), and a second carry bit, Cx(1), assuming the carry-in bit from the previous row was 1.

In all rows, each adder cell after the first adder cell receives two external inputs, Ax and Bx, and two internal inputs, Cx-1(0) and Cx-1(1), from the previous adder cell in the same row. Each adder cell after the first adder cell generates a first sum bit, Sx(0), and a first carry bit, Cx(0), using the Cx-1(0) bit from the previous adder cell, and generates a second sum bit, Sx(1), and a second carry bit, Cx(1), using the Cx-1(1) bit from the previous adder cell. The last adder cell in each row sends its two carry bits, Cx(0) and Cx(1), to the row multiplexer at the end of the row. The carry-in bit from the previous row then selects the correct carry-out bit to be sent to the following row.

Because each row is shorter than the next following row, the carry-out bit from each row is available as the carry-in bit to the next following row before the last adder cell in the next following row calculates its two carry bits, Cx(0) and Cx(1). Thus, the carry-out bits from the rows ripple upward through the row multiplexers faster than the dual carry bits ripple through the adder cells in each row.

For example, at time t1, adder cells C0, C2, C6, C11, C17 and C24 have calculated an initial set of carry-out bits and sums for each case of carry-in bits (i.e., 1 or 0). The dual carry-out bits from cells C0, C2, C6, C11, C17 and C24 propagate laterally to cells C1, C3, C7, C12, C13 and C25.

At time t2, adder cells C1, C3, C7, C12, C18 and C25 calculate another set of carry-out bits and sums for each case of carry-in bits (i.e., 1 or 0). At this point, Row 0 is complete and CI selects one of the carry-out bits, C1(0) or C1(1)), from C1 as Carry Out 0 for Row 0 (i.e., Carry In 1 for Row 1). The dual carry-out bits from cells C3, C7, C12, C18 and C25 propagate laterally to cells C4, C8, C13, C19 and C26.

At time t3, adder cells C4, C8, C13, C19 and C26 calculate another set of carry-out bits and sums for each case of carry-in bits (i.e., 1 or 0). The dual carry-out bits from cells C4, C8, C13, C19 and C26 propagate laterally to cells C5, C9, C14, C20 and C27. At time t4, cells C5, C9, C14, C20 and C27 calculate another set of carry-out bits and sums for each case of carry-in bits (i.e., 1 or 0). At this point, Row 1 is complete and Carry In 1 selects one of the carry-out bits, C5(0) or C5(1)), from C5 as Carry Out 1 for Row 1 (i.e., Carry In 2 for Row 2). The dual carry-out bits from cells C9, C14, C20 and C27 propagate laterally to cells C10, C15, C21 and C28.

At time t5, adder cells C10, C15, C21 and C28 calculate another set of carry-out bits and sums for each case of carry-in bits (i.e., 1 or 0). At this point, Row 2 is complete and Carry In 2 selects one of the carry-out bits, C10(0) or C10(1)), from C10 as Carry Out 2 for Row 2 (i.e., Carry In 3 for Row 3). The dual carry-out bits from cells C15, C21 and C28 propagate laterally to cells C16, C22 and C29.

At time t6, adder cells C16, C22 and C29 calculate another set of carry-out bits and sums for each case of carry-in bits (i.e., 1 or 0). At this point, Row 3 is complete and Carry In 3 selects one of the carry-out bits, C16(0) or C16(1)), from C16 as Carry Out 3 for Row 3 (i.e., Carry In 4 for Row 4). The dual carry-out bits from cells C22 and C29 propagate laterally to cells C23 and C30.

At time t7, adder cells C23 and C30 calculate another set of carry-out bits and sums for each case of carry-in bits (i.e., 1 or 0). At this point, Row 4 is complete and Carry In 4 selects one of the carry-out bits, C23(0) or C23(1)), from C23 as Carry Out 4 for Row 4 (i.e., Carry In 5 for Row 5). The dual carry-out bits from cell C30 propagate laterally to cell C31.

At time t8, adder cell C31 calculates final carry-out bits and sums for each case of carry-in bits (i.e., 1 or 0). At this point, Row 5 is complete and Carry In 5 selects one of the carry-out bits, C31(0) or C31(1)), from C31 as Carry Out 5 for Row 5 (i.e., COUT for 32-bit race delay adder 300).

The unique architecture of 32-bit race delay adder 300 reduces the delay time of a 32-bit addition to the delay time of an 8-bit addition. The delay of 32-bit race delay adder 300 is equal to the carry ripple delay of the 8 adder cells in Row 5 plus the propagation delay of Row 5 MUX. This is a large improvement over the ripple delay of conventional 32-bit adders.

Figure 4:
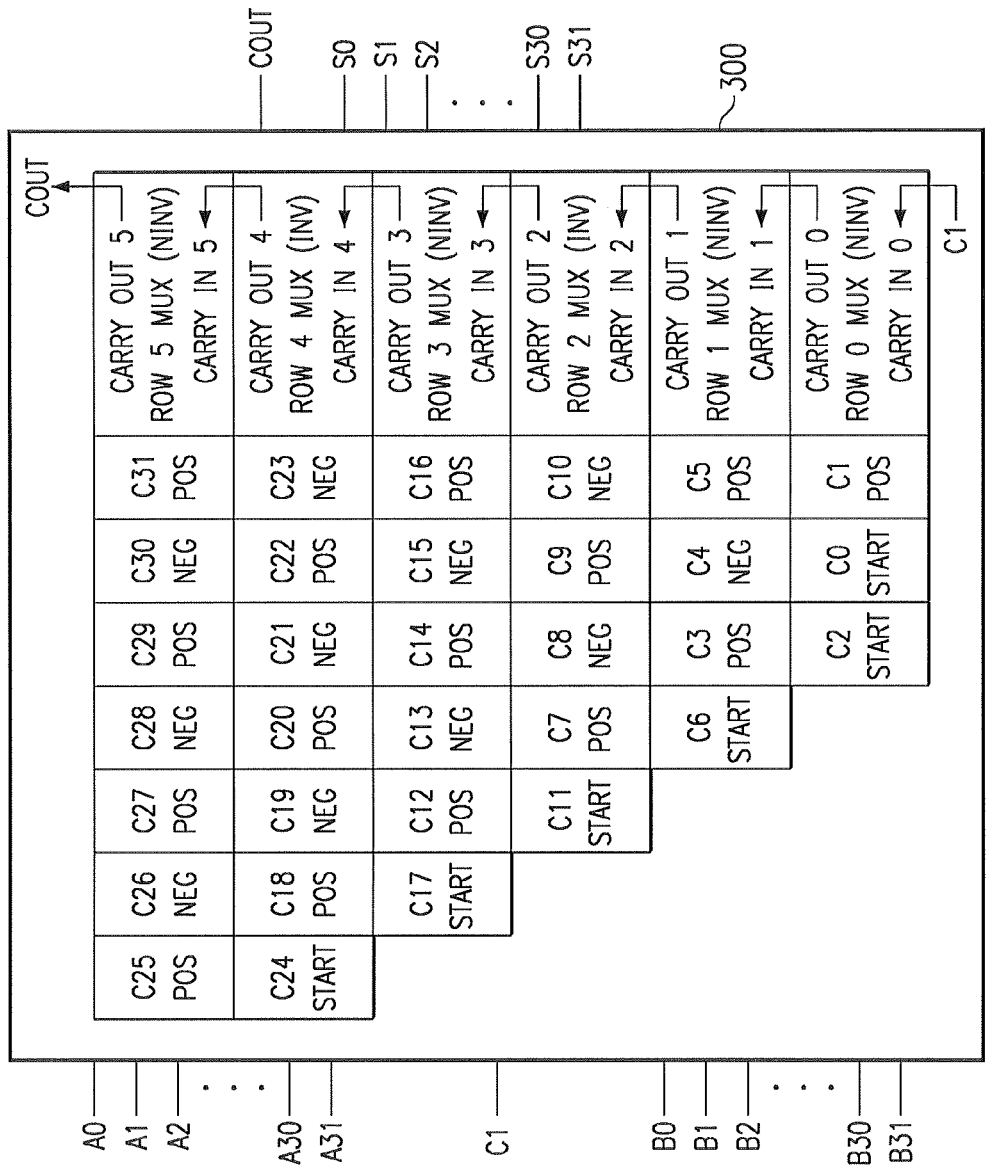
FIG. 4 is a physical layout diagram illustrating the arrangement of the adder cells in the exemplary 32-bit race delay adder according to one embodiment of the present invention.

FIG. 4 is a physical layout diagram illustrating the arrangement of the adder cells in exemplary 32-bit race delay adder 300 according to one embodiment of the present invention. In order to minimize the integrated circuit space occupied by 32-bit race delay adder 300, the first cell in each of Rows 1-5 (i.e., C2, C6, C11, C17, and C24) is dropped down to the end of the row below it. For example, Cell 2 is dropped down to the end of Row 0, Cell 6 is dropped down to the end of Row 1, and so forth. Each of Rows 1-5 is now L-shaped. However, the new physical layout does not effect the functional operation of 32-bit race delay adder 300, as described above in FIG. 3. In other words, the dual carry bits, C2(0) and C2(1) from Cell 2 still propagate to Cell 3, the dual carry bits, C6(0) and C6(1) from Cell 6 still propagate to Cell 7, and so forth.

Additionally, each of the adder cells in 32-bit race delay adder 300 is identified as one of a start cell, a positive (POS) cell, or a negative (NEG) cell. The terms start cell, POS cell, and NEG cell indicate the fact that there are three types of adder cells in 32-bit race delay adder 300. The time critical data paths through the adder cells in each row are the dual carry paths, Cx(0) and Cx(1). As will be seen below, each adder cell contains a pass gate (or switch) that propagates the dual carry bits on to the next cell. Each pass gate attenuates the carry signal so that after two or three pass gates, the carry signal may be read incorrectly. The typical solution to this is to add a buffer in each cell to boost the carry signal.

The buffer is typically a pair of inverter gates in series. Unfortunately, this adds two gate delays per adder cell in the time critical data paths. In Row 5, which has eight adder cells, this would add about sixteen inverter gate delays. To overcome this problem, the present invention splits the buffer gates into a first inverter in one adder cell and a second inverter in the next sequential adder cell. An adder cell that receives positive logic dual carry-in bits from a preceding adder cell and inverts them to negative logic dual carry-out bits is referred to as a NEG cell. An adder cell that receives negative logic dual carry-in bits from a preceding adder cell and inverts them to positive logic dual carry-out bits is referred to as a POS cell.

The first cell in each row is a start cell (i.e., C0, C2, C6, C11, C17, and C24). All of the start cells generate negative logic dual carry-out bits. The even cell positions in each row are POS cells. Therefore, the second cell (i.e., C1, C3, C7, C12, C18 and C25) in each row is a POS cell, the fourth cell (i.e., C5, C9, C14, C20 and C27) in each row is a POS cell, the sixth cell (i.e., C16, C22 and C29) in each row is a POS cell, and the eighth cell (i.e., C31) in each row is a POS cell.

Correspondingly, the odd cell positions in each row are NEG cells (excluding the first cell which is a start cell). Therefore, the third cell (i.e., C4, C8, C13, C19 and C26) in each row is a NEG cell, the fifth cell (i.e., C10, C15, C21 and C28) in each row is a NEG cell, and the seventh cell (i.e., C23 and C30) in each row is a NEG cell.

The total number of inversions in each row must be even in order to maintain positive logic between the input pins and the output pins. Since some rows have an even number of adder cells (and inversions) and some have an odd number of adder cells (and inversions), the row multiplexers may be inverting multiplexers or non-inverting multiplexers to compensate. In Row 0, a first inversion occurs in Cell 0 (a start cell) and a second inversion occurs in Cell 1 (a POS cell). Since this is an even number of inversions, Row 0 MUX is non-inverting (NINV).

In Row 1, a first inversion occurs in Cell 2 (a start cell), a second inversion occurs in Cell 3 (a POS cell), a third inversion occurs in Cell 4 (a NEG cell), and a fourth inversion occurs in Cell 5 (a POS cell). Since this is an even number of inversions, Row 1 MUX is non-inverting (NINV). Following this logic, it can be seen that Row 2 MUX is inverting (INV), Row 3 MUX is non-inverting (NINV), Row 4 MUX is inverting (INV), and Row 5 MUX is non-inverting (NINV).

Figure 5:
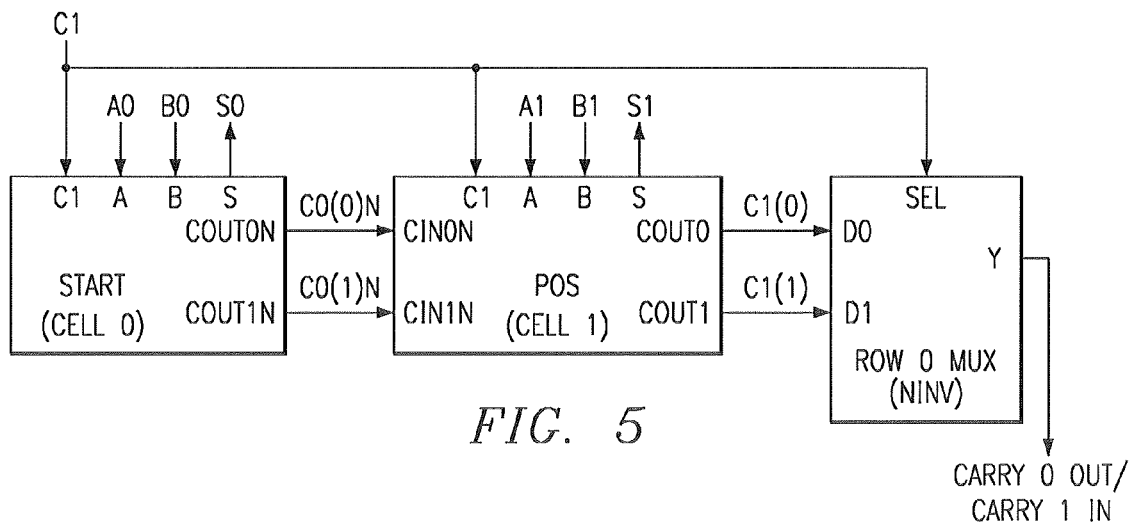
FIGS. 5-7 are schematic block diagrams illustrating in greater detail the inversion logic in Row 0, Row 1 and Row 2 in the exemplary 32-bit race delay adder according to one embodiment of the present invention.
Figure 6:
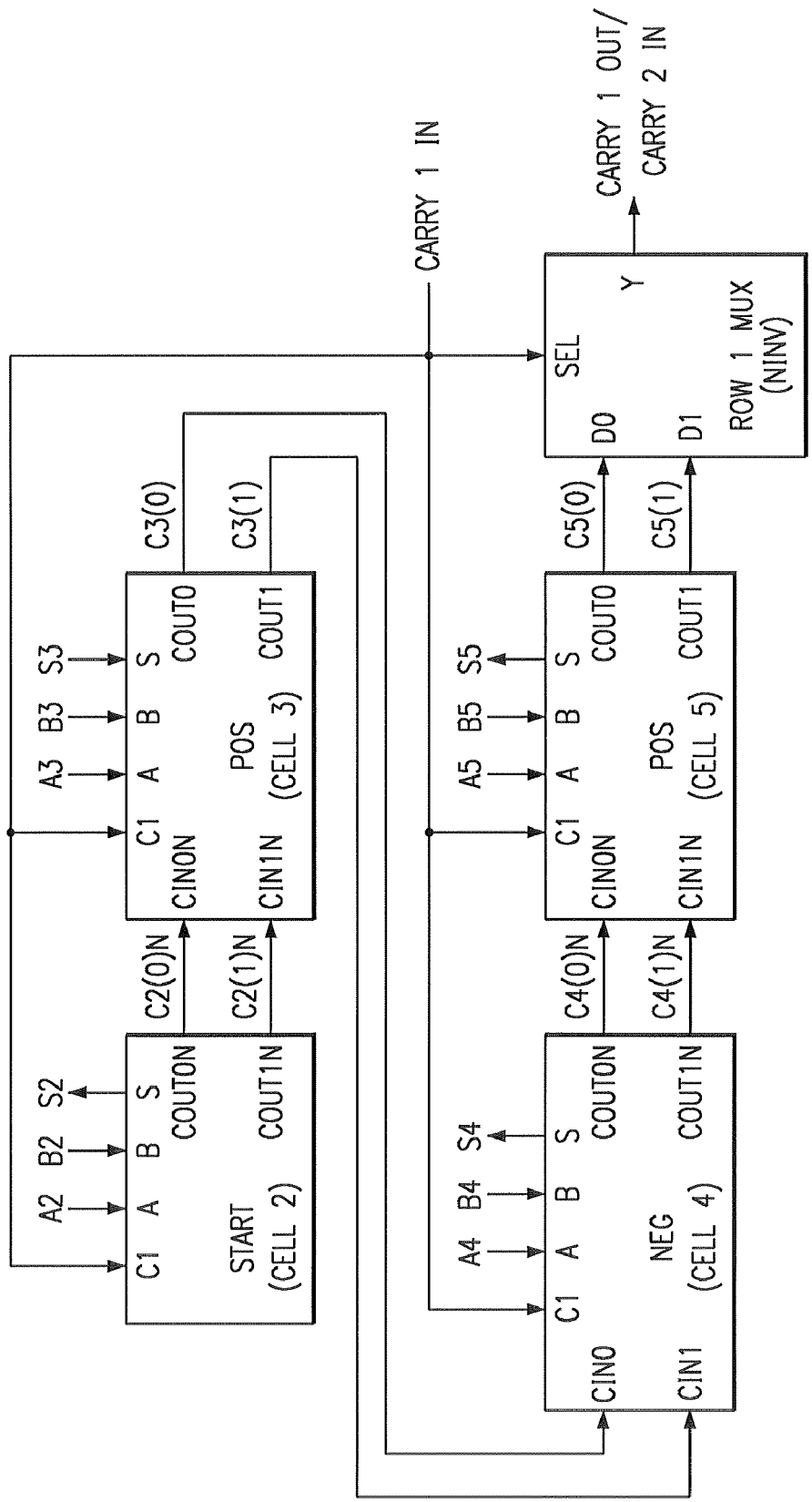
Figure 7:
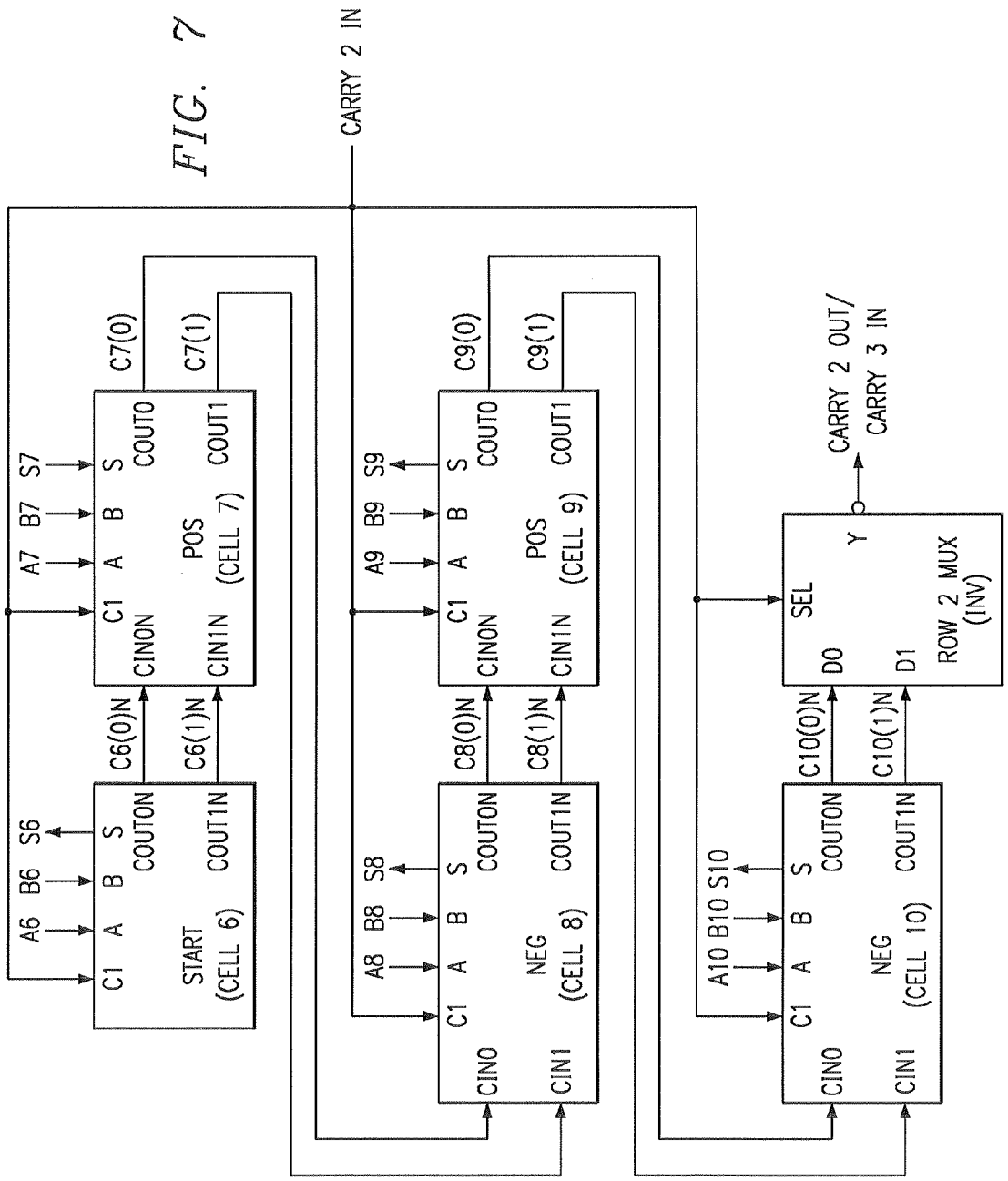

FIGS. 5-7 are schematic block diagrams illustrating in greater detail the inversion logic in Row 0, Row 1 and Row 2 in exemplary 32-bit race delay adder 300 according to one embodiment of the present invention. In FIGS. 5-7, the letter N is used at the end of signal names are used to indicate negative logic (or active low signals). If a signal name does not end in the letter N, the signal is positive logic (or active high signals).

As FIGS. 5-7 show, each start cell (i.e., C0 in FIG. 5, C2 in FIG. 6, and C6 in FIG. 7) has three inputs (A, B, CI) and three outputs (S, COUT0N, COUT1N). The argument bits A and B are coupled to the corresponding bits in A0-A31 and B0-B31 for that adder cell. The sum bit S is coupled to the corresponding bit in S0-S31. CI receives the carry-in bit for that row. The CI input controls an internal multiplexer in each start cell that selects one of two internal sum bits generated by the start cell. The CI input does not affect the values of the dual carry-out bits. The dual carry-out bits, COUT0N and COUT1N, from each start cell are negative logic signals. COUT0N is the carry-out bit assuming that the carry-in for that row was a Logic 0. COUT1N is the carry-out bit assuming that the carry-in for that row was a Logic 1.

As FIGS. 5-7 show, each POS cell (i.e., C1 in FIG. 5, C3 and C5 in FIG. 6, and C7 and C9 in FIG. 7) has five inputs (A, B, CI, CIN0N, CIN1N) and three outputs (S, COUT0, COUT1). The argument bits A and B are coupled to the corresponding bits in A0-A31 and B0-B31 for that adder cell. The sum bit S is coupled to the corresponding bit in S0-S31. CI receives the carry-in bit for that row. The CI input controls an internal multiplexer in each POS cell that selects one of two internal sum bits generated by the POS cell. The CI input does not affect the values of the dual carry-out bits. The dual carry-out bits, COUT0 and COUT1, from each POS cell are positive logic signals. COUT0 is the carry-out bit assuming that the carry-in for that row was a Logic 0. COUT1 is the carry-out bit assuming that the carry-in for that row was a Logic 1. The dual carry-in bits, CIN0N and CIN1N, to each POS cell are negative logic signals, since a POS cell is always coupled to the output of a start cell or a NEG cell. CIN0N is the carry-in bit assuming that the carry-in for that row was a Logic 0. CIN1N is the carry-in bit assuming that the carry-in for that row was a Logic 1.

As FIGS. 6 and 7 show, each NEG cell (i.e., C4 in FIG. 6, and C8 and C10 in FIG. 7) has five inputs (A, B, CI, CIN0, CIN1) and three outputs (S, COUT0N, COUT1N). The argument bits A and B are coupled to the corresponding bits in A0-A31 and B0-B31 for that adder cell. The sum bit S is coupled to the corresponding bit in S0-S31. CI receives the carry-in bit for that row. The CI input controls an internal multiplexer in each NEG cell that selects one of two internal sum bits generated by the NEG cell. The CI input does not affect the values of the dual carry-out bits. The dual carry-out bits, COUT0N and COUT1N, from each NEG cell are negative logic signals. COUT0N is the carry-out bit assuming that the carry-in for that row was a Logic 0. COUT1N is the carry-out bit assuming that the carry-in for that row was a Logic 1. The dual carry-in bits, CIN0 and CIN1, to each NEG cell are positive logic signals, since a NEG cell is always coupled to the output of a POS cell. CIN0 is the carry-in bit assuming that the carry-in for that row was a Logic 0. CIN1 is the carry-in bit assuming that the carry-in for that row was a Logic 1.

Row 0 and Row 1 end with non-inverting multiplexers, namely Row 0 MUX and Row 1 MUX, respectively. Row 2 ends with an inverting multiplexer, namely Row 2 MUX. The bubble symbol on the output of Row 2 MUX indicates the inverting nature of Row 2 MUX.

The operations of Row 3, Row 4 and Row 5 are very similar to the operations of Row 0, Row 1 and Row 2. Each of Rows 3-5 begins with a start adder cell and contains a sequence of alternating POS adder cells and NEG adder cells. Each of Rows 3-5 ends with either an inverting multiplexer or a non-inverting multiplexer. In order to avoid redundancy in explaining the operation of the present invention, additional detailed description of the operation of Rows 3-5 are omitted.

TABLE 1 below is the truth table for a generic adder cell that receives the inputs A, B, and CI (i.e., carry-in bit) and produces the outputs, S (sum bit) and CO (carry-out bit):

TABLE 1

| CI | A | B | CO | S |
|----|---|---|----|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Figure 8:
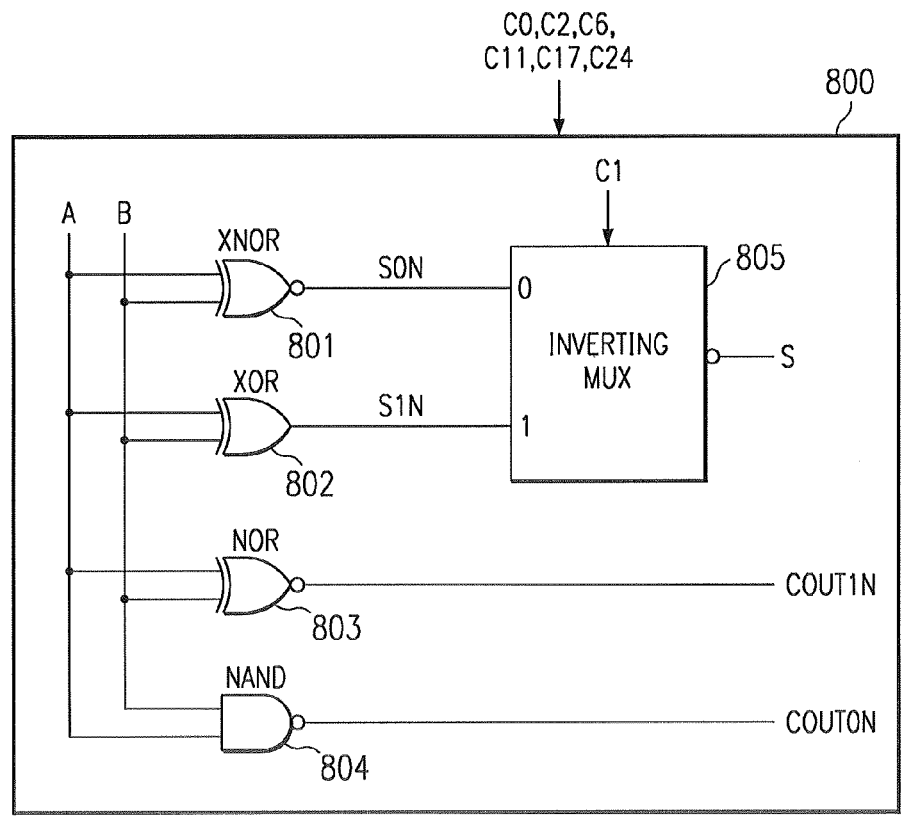
FIG. 8 is a detailed schematic of an exemplary start adder cell in the 32-bit race delay adder according to one embodiment of the present invention.

FIG. 8 is a detailed schematic of exemplary start adder cell 800 in exemplary 32-bit race delay adder 300 according to one embodiment of the present invention. Exemplary start adder cell 800 may be any one of adder cells C0, C2, C6, C11, C17 or C24. Start adder cell 800 comprises exclusive-NOR (XNOR) gate 801, exclusive-OR (XOR) gate 802, NOR gate 803, NAND gate 804, and inverting multiplexer (MUX) 805. The output of NOR gate 803 is the negative logic signal COUT1N (carry-in, CI, assumed to be 1) and the output of NAND gate 804 is the negative logic signal COUT0N (carry-in, CI, assumed to be 0). XNOR gate 801 produces the conditional sum S0N, which is a negative logic signal (carry-in, CI, assumed to be 0). XOR gate 802 produces the conditional signal S1N, which is a negative logic signal (carry-in assumed to be 1). The output of inverting MUX 805 is the sum bit, S, which is a positive logic signal. The carry-in signal, CI, selects the correct one of S0N and S1N when CI finally becomes available from the previous row. However, the dual carry-out signals COUT0N and COUT1N do not wait for CI, but instead propagate as soon as A and B are available.

The following is a truth table for the negative logic signals COUT1N and COUT0N:

TABLE 2

| A | B | TRUE CARRY (CI = 0) | COUT0N | TRUE CARRY (CI = 1) | COUT1N |
|---|---|---|---|---|---|
| 0 | 0 | 0 | 1 | 0 | 1 |
| 0 | 1 | 0 | 1 | 1 | 0 |
| 1 | 0 | 0 | 1 | 1 | 0 |
| 1 | 1 | 1 | 0 | 1 | 0 |

As TABLE 2 illustrates, COUT0N is always the inverse of what the true carry value would be, assuming that the carry-in bit, CI, is Logic 0. Similarly, COUT1N is always the inverse of what the true carry value would be, assuming that the carry-in bit, CI, is Logic 1.

The following is a truth table for the negative logic signals S0N and S1N and the output, S, of inverting MUX 805:

TABLE 3

| A | B | S0N (CI = 0) | S1N (CI = 1) | S (CI = 0) | S (CI = 1) |
|---|---|---|---|---|---|
| 0 | 0 | 1 | 0 | 0 | 1 |
| 0 | 1 | 0 | 1 | 1 | 0 |
| 1 | 0 | 0 | 1 | 1 | 0 |
| 1 | 1 | 1 | 0 | 0 | 1 |

As TABLE 3 illustrates, S0N is always the inverse of what the true sum bit, S, would be, assuming that the carry-in bit, CI, is Logic 0. However, when CI=0 is finally applied to inverting MUX 805, S0N is inverted to give the true value (positive logic) of the sum bit, S, when CI=0. Similarly, SiN is always the inverse of what the true sum bit, S, would be, assuming that the carry-in bit, CI, is Logic 1. However, when CI=1 is finally applied to inverting MUX 805, SiN is inverted to give the true value (positive logic) of the sum bit, S, when CI=1.

Figure 9:
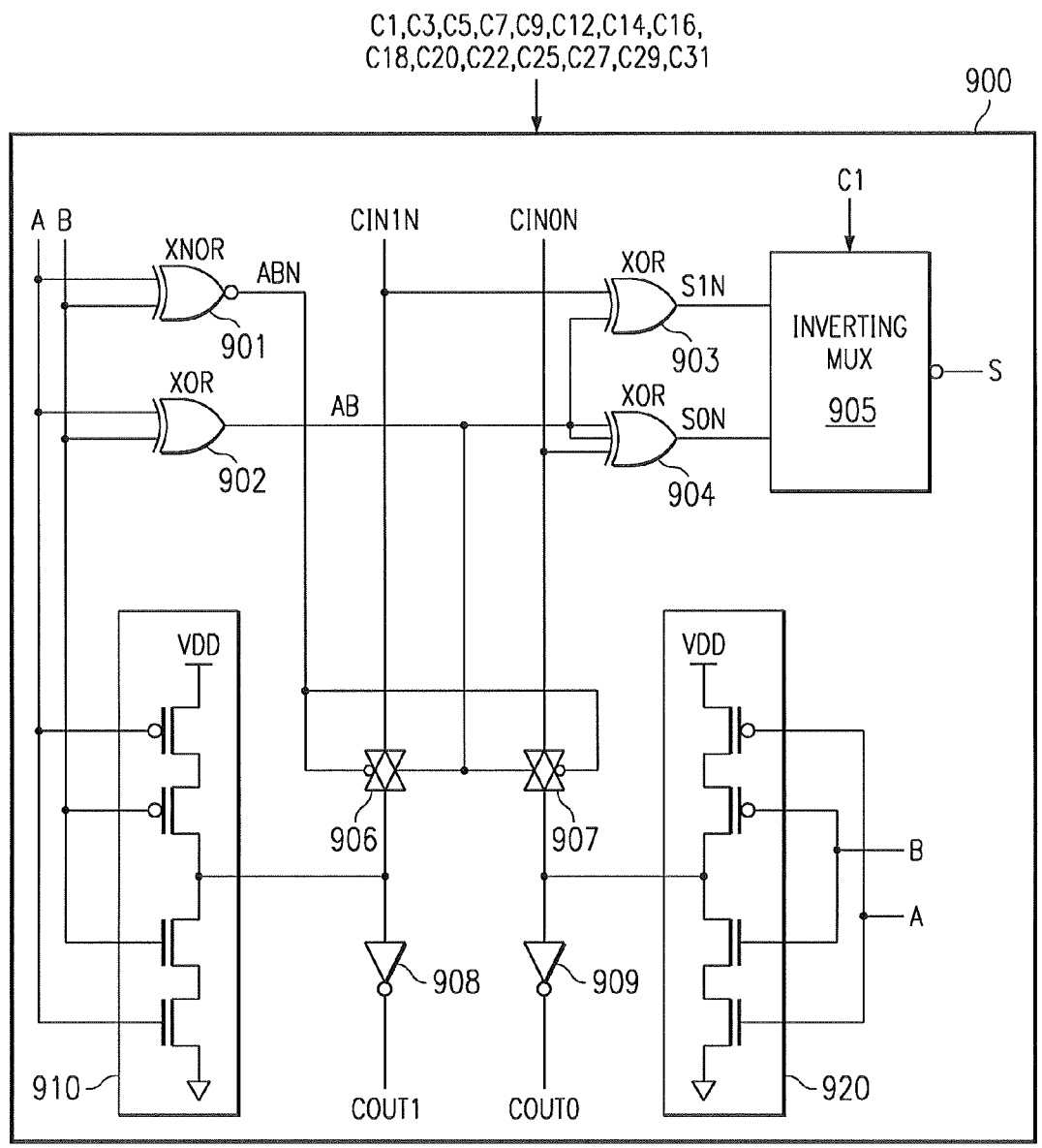
FIG. 9 is a detailed schematic of an exemplary POS adder cell in the 32-bit race delay adder according to one embodiment of the present invention.

FIG. 9 is a detailed schematic of exemplary POS adder cell 900 in exemplary 32-bit race delay adder 300 according to one embodiment of the present invention. POS adder cell 900 may be any one of adder cells C1, C3, C5, C7, C9, C12, C14, C16, C18, C20, C22, C25, C27, C29, and C31. POS adder cell 900 comprises exclusive-NOR (XNOR) gate 901, exclusive-OR (XOR) gate 902, XOR gate 903, XOR gate 904, and inverting multiplexer (MUX) 905. POS adder cell 900 also comprises pass gate 906, pass gate 907, inverter 908, inverter 909, stack inverter 910 and stack inverter 920. The inputs to POS adder cell 900 are the argument bits, A and B, and a pair of negative logic carry-in bits, CIN1N and CIN0N from a preceding NEG adder cell or start adder cell.

TABLE 4 below is a truth table for the negative logic signal S1N and the output, S, of inverting MUX 905, when the carry-in from the previous row is Logic 1 (i.e., CI=1). The signal AB is the output of XOR gate 902:

TABLE 4

| CIN1N | A | B | AB | S1N | S |
|---|---|---|---|---|---|
| 1 | 0 | 0 | 0 | 1 | 0 |
| 1 | 0 | 1 | 1 | 0 | 1 |
| 1 | 1 | 0 | 1 | 0 | 1 |
| 1 | 1 | 1 | 0 | 1 | 0 |
| 0 | 0 | 0 | 0 | 0 | 1 |
| 0 | 0 | 1 | 1 | 1 | 0 |
| 0 | 1 | 0 | 1 | 1 | 0 |
| 0 | 1 | 1 | 0 | 0 | 1 |

Note that when there is a carry-in from the previous stage, CIN1N is 0 (negative logic signal), and when there is not carry-in from the previous stage, CIN1N is 1. Thus, the sum bit output, S, in TABLE 4 is equivalent to the sum bit output, S, of the generic adder cell in TABLE 1.

TABLE 5 below is a truth table for the negative logic signal S0N and the output, S, of inverting MUX 905, when the carry-in from the previous row is Logic 0 (i.e., CI=0). The signal AB is the output of XOR gate 902:

TABLE 5

| CIN0N | A | B | AB | S0N | S |
|---|---|---|---|---|---|
| 1 | 0 | 0 | 0 | 1 | 0 |
| 1 | 0 | 1 | 1 | 0 | 1 |
| 1 | 1 | 0 | 1 | 0 | 1 |
| 1 | 1 | 1 | 0 | 1 | 0 |
| 0 | 0 | 0 | 0 | 0 | 1 |
| 0 | 0 | 1 | 1 | 1 | 0 |
| 0 | 1 | 0 | 1 | 1 | 0 |
| 0 | 1 | 1 | 0 | 0 | 1 |

Note that when there is carry-in from the previous stage, CIN0N is 0 (negative logic signal), and when there is not carry-in from the previous stage, CIN0N is 1. Thus, the sum bit output, S, in TABLE 5 is equivalent to the sum bit output, S, of the generic adder cell in TABLE 1.

TABLE 1 for the generic adder cell shows that when the input bits A and B are both 0, the carry-out bit, CO, is always 0, regardless of the value of the carry-in bit, CI. TABLE 1 also shows that when the input bits A and B are both 1, the carry-out bit, CO, is always 1, regardless of the value of the carry-in bit, CI. The CI bit only affects the value of the carry-out bit, CO, if A and B are different.

In POS adder cell 900, stack inverters 910 and 920 are used to determine the values of the dual carry-out bits, COUT1 and COUT0, when A and B are equal. When A and B are equal, the output of XOR gate 902, AB, is 0, and the output of XNOR gate 901, ABN, is 1. This shuts off pass gates 906 and 907 so that inverters 908 and 909 are driven by stack inverters 910 and 920.

When A and B are both 0, the N-type transistors in the bottom of stack inverter 910 are OFF and the P-type transistors in the top of stack inverter 910 are ON. This pulls the output of stack inverter 910 to 1 (i.e., Vdd supply), which is inverted by inverter 908 to 0 (i.e., COUT1=0). When A and B are both 1, the N-type transistors in the bottom of stack inverter 910 are ON and the P-type transistors in the top of stack inverter 910 are OFF. This pulls the output of stack inverter 920 to 0 (i.e., ground), which is inverted by inverter 908 to 1 (i.e., COUT1=1).

Similarly, when A and B are both 0, the N-type transistors in the bottom of stack inverter 920 are OFF and the P-type transistors in the top of stack inverter 920 are ON. This pulls the output of stack inverter 920 to 1 (i.e., Vdd supply), which is inverted by inverter 909 to 0 (i.e., COUT0=0). When A and B are both 1, the N-type transistors in the bottom of stack inverter 920 are ON and the P-type transistors in the top of stack inverter 920 are OFF. This pulls the output of stack inverter 920 to 0 (i.e., ground), which is inverted by inverter 909 to 1 (i.e., COUT0=1).

When A and B are not equal, one of the N-type transistors and one of the P-type transistors in both stack inverter 910 and stack inverter 920 are OFF. This shuts off stack inverters 910 and 920 and leaves the outputs of stack inverters 910 and 920 in high impedance states. Thus, pass gates 906 and 907 may drive the inputs of inverters 908 and 909.

When A and B are not equal, the output of XOR gate 902, AB, is 1, and the output of XNOR gate 901, ABN, is 0. This turns on both pass gate 906 and pass gate 907. At this point, the carry-in bit, CIN1N, from the preceding adder cell is applied to the input of inverter 908 and inverted to produce the carry-out bit COUT1. Thus, a negative logic carry-in bit (CIN1N) is converted to a positive logic carry-out bit (COUT1). Similarly, the carry-in bit, CIN0N, from the preceding adder cell is applied to the input of inverter 909 and inverted to produce the carry-out bit COUT0. Thus, a negative logic carry-in bit (CIN0N) is converted to a positive logic carry-out bit (COUT0).

Figure 10:
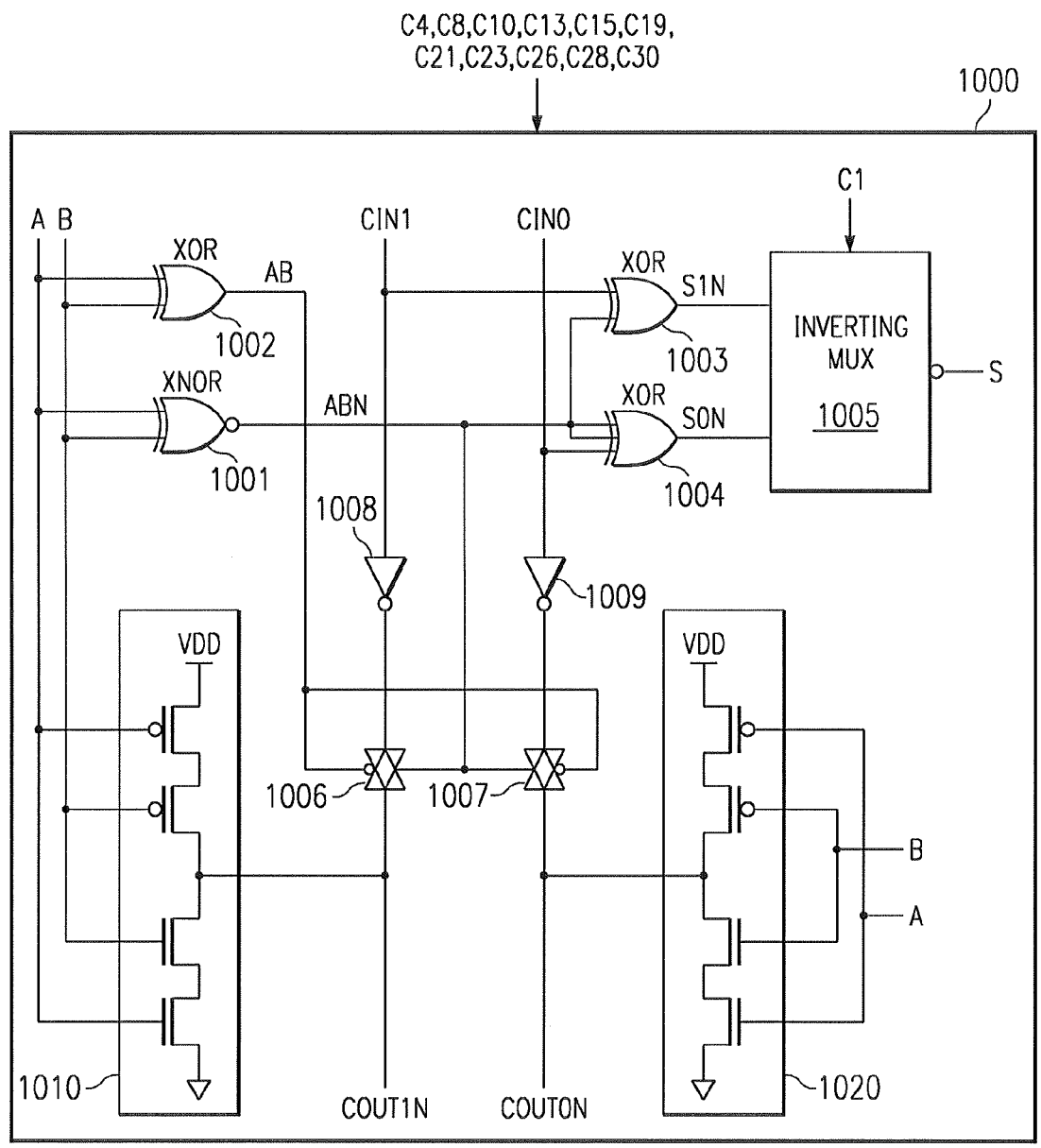
FIG. 10 is a detailed schematic of an exemplary NEG adder cell in the 32-bit race delay adder according to one embodiment of the present invention.

FIG. 10 is a detailed schematic of exemplary NEG adder cell 1000 in exemplary 32-bit race delay adder 300 according to one embodiment of the present invention. NEG adder cell 1000 may be any one of adder cells C4, C8, C10, C13, C15, C19, C21, C23, C26, C28, and C30. NEG adder cell 1000 comprises exclusive-NOR (XNOR) gate 1001, exclusive-OR (XOR) gate 1002, XOR gate 1003, XOR gate 1004, and inverting multiplexer (MUX) 1005. NEG adder cell 1000 also comprises pass gate 1006, pass gate 1007, inverter 1008, inverter 1009, stack inverter 1010 and stack inverter 1020. The inputs to NEG adder cell 1000 are the argument bits, A and B, and a pair of positive logic carry-in bits, CIN1 and CIN0 from a preceding POS adder cell.

NEG adder cell 1000 is similar in most respects to POS adder cell 900 with a few small differences:

1. The output, ABN, of XNOR gate 1001 is applied to XOR gates 1003 and 1004, rather than the output, AB, of XOR gate 1002; and 2. The order of pass gates 1006 and 1007 and inverters 1008 and 1009 are reversed.

Since CIN1 and CIN0 are positive logic signals, the sum bits S1N and S0N are generated by XOR gate 1003 and 1004 using ABN, rather than AB as in the case of POS adder cell 900.

In NEG adder cell 1000, when A and B are the same, pass gates 1006 and 1007 are OFF and the outputs of stack inverters 1010 and 1020 drive the output lines COUT1N and COUT0N, respectively, without inversion. Therefore, when A=B=0, then COUT1N=COUT0N=1, and when A=B=1, then COUT1N=COUT0N=0.

When A and B are not equal, pass gates 1006 and 1007 are ON and stack inverters 1010 and 1020 are OFF. In this case, inverters 1008 and 1009 invert the inputs CIN1 and CIN0 to drive the negative logic carry-out signals, COUT1N and COUT0N.

Although the present invention has been described in detail, those skilled in the art should understand that they can make various changes, substitutions and alterations herein without departing from the spirit and scope of the invention in its broadest form.

What is claimed is:

1. An M-bit adder capable of receiving a first M-bit argument, a second M-bit argument, and a carry-in (CI) bit comprising:

M adder cells arranged in R rows, wherein a least significant adder cell in a first one of said rows of adder cells is operable to:

receive a first data bit, $A_X$, from said first M-bit argument and a first data bit, $B_X$, from said second M-bit argument, generate both a first conditional carry-out bit, $C_X(1)$, and a second conditional carry-out bit, $C_X(0)$, provide the first and second conditional carry-out bits $C_X(1)$ and $C_X(0)$ to a second one of said adder cells, and wherein said $C_X(1)$ bit is calculated assuming a row carry-out bit from a second row of adder cells preceding said first row is a 1 and said $C_X(0)$ bit is calculated assuming said row carry-out bit from said second row is a 0; and wherein said second one of said adder cells within said first one of said rows is operable to:

receive a first data bit, $A_{X+1}$, from said first M-bit argument and a first data bit, $B_{X+1}$, from said second M-bit argument, receive both said first conditional carry-out bit, $C_X(1)$ and said second conditional carry-out bit $C_X(0)$, generate both a first conditional carry-out bit, $C_{X+1}(1)$, and a second conditional carry-out bit, $C_{X+1}(0)$, by propagating said first conditional carry-out bit $C_X(1)$ and said second conditional carry-out bit $C_X(0)$ through a first pass gate and a second pass gate, respectively, when said first data bit $A_{X+1}$ and said second data bit $B_{X+1}$ are not equal, and output said first and second conditional carry-out bits $C_{X+1}(1)$ and $C_{X+1}(0)$ to other circuitry, and wherein said second adder cell further comprises:

a first inverter operable for inverting said first conditional carry-out bit $C_X(1)$ transmitted through said first pass gate prior to outputting said first conditional carry-out bit $C_X(1)$; and a second inverter operable for inverting said second conditional carry-out bit $C_X(0)$ transmitted through said second pass gate prior to outputting said second conditional carry-out bit $C_X(0)$.

2. The M-bit adder as set forth in claim 1 wherein said least significant adder cell generates a first conditional sum bit, $S_X(1)$, and a second conditional sum bit, $S_X(0)$.

3. The M-bit adder as set forth in claim 2 wherein said $S_X(1)$ bit is calculated assuming said row carry-out bit from said second row is a 1 and said $S_X(0)$ bit is calculated assuming said row carry-out bit from said second row is a 0.

4. The M-bit adder as set forth in claim 3 wherein said row carry-out bit selects one of said $S_X(1)$ bit and said $S_X(0)$ bit to be output by said least significant adder cell.

5. The M-bit adder as set forth in claim 4 wherein said other circuitry comprises:

a third adder cell in said first one of said rows of adder cells, and wherein said third adder cell receives a third data bit, $A_{X+2}$, from said first M-bit argument and a third data bit, $B_{X+2}$, from said second M-bit argument, and receives from said second adder cell said $C_{X+1}(1)$ bit and said $C_{X+1}(0)$ bit.

6. The M-bit adder as set forth in claim 4 wherein said second adder cell generates a first conditional sum bit, $S_{X+1}(1)$, wherein said $S_{X+1}(1)$ bit is generated from said $A_{X+1}$ data bit, said $B_{X+1}$ data bit, and said $C_X(1)$ bit from said least significant adder cell.

7. The M-bit adder as set forth in claim 6 wherein said second adder cell generates a second conditional sum bit, $S_{X+1}(0)$, wherein said $S_{X+1}(0)$ bit is generated from said $A_{X+1}$ data bit, said $B_{X+1}$ data bit, and said $C_X(0)$ bit from said least significant adder cell.

8. The M-bit adder as set forth in claim 7 wherein said row carry-out bit selects one of said $S_{X+1}(1)$ bit and said $S_{X+1}(0)$ bit to be output by said second adder cell.

9. The M-bit adder as set forth in claim 7 wherein said first adder cell comprises a first multiplexer operable for receiving said first conditional sum bit $S_X(1)$ and said second conditional sum bit $S_X(0)$, wherein said row carry-out bit selects one of said $S_X(1)$ bit and said $S_X(0)$ bit to be output by said first adder cell, and said second adder cell comprises a second multiplexer operable for receiving said second conditional sum bit $S_{X+1}(1)$ and said second conditional sum bit $S_{X+1}(0)$, wherein said row carry-out bit selects one of said $S_{X+1}(1)$ bit and said $S_{X+1}(0)$ bit to be output by said second adder cell.

10. The M-bit adder as set forth in claim 1 wherein said first row of adder cells contains N adder cells and said second row of adder cells preceding said first row contains less than N adder cells.

11. The M-bit adder as set forth in claim 1 wherein said other circuitry comprises:

a row multiplexer, wherein said row carry-out bit from said second row of adder cells preceding said first row selects one of said $C_{X+1}(1)$ bit and said $C_{X+1}(0)$ bit to be output by said row multiplexer.

12. A data processor comprising:

an instruction execution pipeline comprising N processing stages, each of said N processing stages capable of performing one of a plurality of execution steps associated with a pending instruction being executed by said instruction execution pipeline, wherein at least one of said N processing stages comprises an M-bit adder capable of receiving a first M-bit argument, a second M-bit argument, and a carry-in (CI) bit, said M-bit adder comprising:

M adder cells arranged in R rows, wherein a least significant adder cell in a first one of said rows of adder cells is operable to:

receive a first data bit, $A_X$, from said first M-bit argument and a first data bit, $B_X$, from said second M-bit argument, generate both a first conditional carry-out bit, $C_X(1)$, and a second conditional carry-out bit, $C_X(0)$, provide the first and second conditional carry-out bits $C_X(1)$ and $C_X(0)$ to a second one of said adder cells, and wherein said $C_X(1)$ bit is calculated assuming a row carry-out bit from a second row of adder cells preceding said first row is a 1 and said $C_X(0)$ bit is calculated assuming said row carry-out bit from said second row is a 0; and wherein said second one of said adder cells in said first one of said rows is operable to:

receive a first data bit, $A_{X+1}$, from said first M-bit argument and a first data bit, $B_{X+1}$, from said second M-bit argument, receive both said first conditional carry-out bit $C_X(1)$ and said second conditional carry-out bit $C_X(0)$;

generate both a first conditional carry-out bit, $C_{X+1}(1)$, and a second conditional carry-out bit, $C_{X+1}(0)$, by propagating said first conditional carry-out bit $C_X(1)$ and said second conditional carry-out bit $C_X(0)$ through a first pass gate and a second pass gate, respectively, when said first data bit $A_{X+1}$ and said second data bit $B_{X+1}$ are not equal, and output said first and second conditional carry-out bits $C_{X+1}(1)$ and $C_{X+1}(0)$, and wherein said second adder cell further comprises:

a first inverter operable for inverting said first conditional carry-out bit $C_X(1)$ transmitted through said first pass gate prior to outputting said first conditional carry-out bit $C_X(1)$; and a second inverter operable for inverting said second conditional carry-out bit $C_X(0)$ transmitted through said second pass gate prior to outputting said second conditional carry-out bit $C_X(0)$.

13. The data processor as set forth in claim 12 wherein said least significant adder cell generates a first conditional sum bit, $S_X(1)$, and a second conditional sum bit, $S_X(0)$.

14. The data processor as set forth in claim 13 wherein said $S_X(1)$ bit is calculated assuming said row carry-out bit from said second row is a 1 and said $S_X(0)$ bit is calculated assuming said row carry-out bit from said second row is a 0.

15. The data processor as set forth in claim 14 wherein said row carry-out bit selects one of said $S_X(1)$ bit and said $S_X(0)$ bit to be output by said least significant adder cell.

16. The data processor as set forth in claim 15 wherein said other circuitry comprises:

a third adder cell in said first one of said rows of adder cells, and wherein said third adder cell receives a third data bit, $A_{X+2}$, from said first M-bit argument and a third data bit, $B_{X+2}$, from said second M-bit argument, and receives from said second adder cell said $C_{X+1}(1)$ bit and said $C_{X+1}(0)$ bit.

17. The data processor as set forth in claim 15 wherein said second adder cell generates a first conditional sum bit, $S_{X+1}(1)$, wherein said $S_{X+1}(1)$ bit is generated from said $A_{X+1}$ data bit, said $B_{X+1}$ data bit, and said $C_X(1)$ bit from said least significant adder cell.

18. The data processor as set forth in claim 17 wherein said second adder cell generates a second conditional sum bit, $S_{X+1}(0)$, wherein $S_{X+1}(0)$ bit is generated from said $A_{X+1}$ data bit, said $B_{X+1}$ data bit, and said $C_X(0)$ bit from said least significant adder cell.

19. The data processor as set forth in claim 18 wherein said row carry-out bit selects one of said $S_{X+1}(1)$ bit and said $S_{X+1}(0)$ bit to be output by said second adder cell.

20. The data processor as set forth in claim 18 wherein said first adder cell comprises a first multiplexer operable for receiving said first conditional sum bit $S_X(1)$ and said second conditional sum bit $S_X(0)$, wherein said row carry-out bit selects one of said $S_X(1)$ bit and said $S_X(0)$ bit to be output by said first adder cell; and said second adder cell a second multiplexer operable for receiving said second conditional sum bit $S_{X+1}(1)$ and said second conditional sum bit $S_{X+1}(0)$, wherein said row carry-out bit selects one of said $S_{X+1}(1)$ bit and said $S_{X+1}(0)$ bit to be output by said second adder cell.

21. The data processor as set forth in claim 12 wherein said first row of adder cells contains N adder cells and said second row of adder cells preceding said first row contains less than N adder cells.

22. The data processor as set forth in claim 12 wherein said second adder cell further comprises:
  a first inverter operable for inverting said first conditional carry-out bit $C_X(1)$ transmitted through said first pass gate prior to outputting said first conditional carry-out bit $C_X(1)$; and
  a second inverter operable for inverting said second conditional carry-out bit $C_X(0)$ transmitted through said second pass gate prior to outputting said second conditional carry-out bit $C_X(0)$.

23. The data processor as set forth in claim 12 wherein said second adder cell further comprises:
  a first inverter operable for inverting said received conditional carry-out bit $C_X(1)$ prior to transmission through said first pass gate; and
  a second inverter operable for inverting said received second conditional carry-out bit $C_X(0)$ prior to transmission through said second pass gate.

24. The data processor as set forth in claim 12 wherein said other circuitry comprises:
  a row multiplexer, wherein said row carry-out bit from said second row of adder cells preceding said first row selects one of said $C_{X+1}(1)$ bit and said $C_{X+1}(0)$ bit to be output by said row multiplexer.

25. A method of adding a first M-bit argument and a second M-bit argument in an M-bit adder, the M-bit adder comprising M adder cells arranged in R rows, the method comprising:
  receiving a first data bit, $A_X$, from the first M-bit argument and a first data bit, $B_X$, from the second M-bit argument in a least significant adder cell in a first one of the rows of adder cells;
  calculating in the least significant adder cell a first conditional carry-out bit, $C_X(1)$, assuming a row carry-out bit from a second row of adder cells preceding the first row is a 1;
  calculating in the least significant adder cell a second conditional carry-out bit, $C_X(0)$, assuming the row carry-out bit from the second row is a 0;
  calculating in the least significant adder cell a first conditional sum bit, $S_X(1)$, assuming the row carry-out bit from the second row is a 1;
  calculating in the least significant adder cell a second conditional sum bit, $S_X(0)$, assuming the row carry-out bit from the second row is a 0;
  propagating the $C_X(1)$ bit and the $C_X(0)$ bit to a second adder cell in the first row of adder cells;
  selecting one of the $S_X(1)$ bit and the $S_X(0)$ bit to be output from the least significant adder cell according to a value of the row carry-out bit from the second row; and
  receiving a first data bit, $A_{X+1}$, from the first M-bit argument and a first data bit, $B_{X+1}$, from the second M-bit argument in the second adder cell in said first one of said rows of adder cells;
  generating in said second adder cell both a first conditional carry-out bit, $C_{X+1}(1)$, and a second conditional carry-out bit, $C_{X+1}(0)$, by propagating said first conditional carry-out bit $C_X(1)$ and said second conditional carry-out bit $C_X(0)$ through a first pass gate and a second pass gate, respectively, when said first data bit $A_{X+1}$ and said second data bit $B_{X+1}$ are not equal
  outputting said first and second conditional carry-out bits $C_{X+1}(1)$ and $C_{X+1}(0)$ to other circuitry;
  using a first inverter within said second adder cell, inverting said first conditional carry-out bit $C_X(1)$ transmitted through said first pass gate prior to outputting said first conditional carry-out bit $C_X(1)$; and
  using a second inverter within said second adder cell, inverting said second conditional carry-out bit $C_X(0)$ transmitted through said second pass gate prior to outputting said second conditional carry-out bit $C_X(0)$.

26. An M-bit adder capable of receiving a first M-bit argument, a second M-bit argument, and a carry-in (CI) bit comprising:
  M adder cells arranged in R rows, wherein a least significant adder cell in a first one of said rows of adder cells is operable to:
    receive a first data bit, $A_X$, from said first M-bit argument and a first data bit, Bx from said second M-bit argument,
    generate both a first conditional carry-out bit, $C_X(1)$, and a second conditional carry-out bit, $C_X(0)$,
    provide the first and second conditional carry-out bits $C_X(1)$ and $C_X(0)$ to a second one of said adder cells, and
  wherein said $C_X(1)$ bit is calculated assuming a row carry-out bit from a second row of adder cells preceding said first row is a 1 and said $C_X(0)$ bit is calculated assuming said row carry-out bit from said second row is a 0; and
  wherein said second one of said adder cells within said first one of said rows is operable to:
    receive a first data bit, $A_{X+1}$, from said first M-bit argument and a first data bit, $B_{X+1}$, from said second M-bit argument,
    receive both said first conditional carry-out bit $C_X(1)$ and said second conditional carry-out bit $C_X(0)$,
    generate both a first conditional carry-out bit, $C_{X+1}(1)$, and a second conditional carry-out bit, $C_{X+1}(0)$ by propagating said first conditional carry-out bit $C_X(1)$ and said second conditional carry-out bit $C_X(0)$ through a first pass gate and a second pass gate, respectively, when said first data bit $A_{X+1}$ and said second data bit $B_{X+1}$ are not equal, and
    output said first and second conditional carry-out bits $C_{X+1}(1)$ and $C_{X+1}(0)$ to other circuitry,
  wherein said second adder cell further comprises:
    a first inverter operable for inverting said received conditional carry-out bit $C_X(1)$ prior to transmission through said first pass gate; and
    a second inverter operable for inverting said received second conditional carry-out bit $C_X(0)$ prior to transmission through said second pass gate.

* * * * *

UNITED STATES PATENT AND TRADEMARK OFFICE
CERTIFICATE OF CORRECTION

| | | |
|---|---|---|
| PATENT NO. | : 7,571,204 B1 | Page 1 of 1 |
| APPLICATION NO. | : 09/667164 | |
| DATED | : August 4, 2009 | |
| INVENTOR(S) | : William E. Ballachino | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1591 days.

Signed and Sealed this

Seventh Day of September, 2010

David J. Kappos
*Director of the United States Patent and Trademark Office*